United States Patent [19]

Baba et al.

[11] Patent Number: 4,706,124
[45] Date of Patent: Nov. 10, 1987

[54] FOCUS DETECTING DEVICE WHICH VARIES BETWEEN A VARYING STATE AND A FIXED STATE

[75] Inventors: Takeshi Baba; Shigeyuki Suda, both of Tokyo, Japan

[73] Assignee: Canon Kabushiki Kaisha, Tokyo, Japan

[21] Appl. No.: 15,532

[22] Filed: Feb. 12, 1987

Related U.S. Application Data

[63] Continuation of Ser. No. 832,722, Feb. 25, 1986, abandoned.

[30] Foreign Application Priority Data

Feb. 26, 1985 [JP] Japan .................................. 60-36769

[51] Int. Cl.$^4$ ................................................ G03B 3/10
[52] U.S. Cl. ................................................... 358/227
[58] Field of Search ............... 358/227, 225; 354/400, 354/404; 250/201 AF

[56] References Cited

U.S. PATENT DOCUMENTS

| | | | |
|---|---|---|---|
| 3,617,633 | 11/1971 | Barr | 358/227 |
| 4,354,204 | 10/1982 | Kimura | 358/227 |
| 4,370,038 | 1/1983 | Kimura | 358/227 |
| 4,484,806 | 11/1984 | Onishi et al. | 358/227 |

FOREIGN PATENT DOCUMENTS 0228088 10/1985 German Democratic Rep. .................................. 354/400

Primary Examiner—Gene Z. Rubinson
Assistant Examiner—Stephen Brinich
Attorney, Agent, or Firm—Fitzpatrick, Cella, Harper & Scinto

[57] ABSTRACT

A focus detecting device comprises an image sensor; sharpness detecting means for detecting the sharpness of an image from image signals obtained from the image sensor; in-focus state identifying means for identifying an in-focus state of the image on the image sensor by comparing plural values of sharpness detected in different focus states; and focus state control means for varying the focus state during a period t at an interval T, wherein t<T, and maintaining a fixed focus state during a period T−t.

22 Claims, 7 Drawing Figures

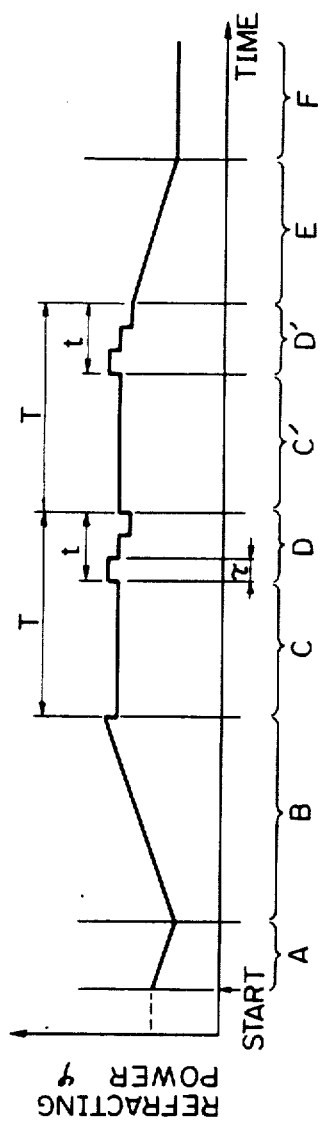
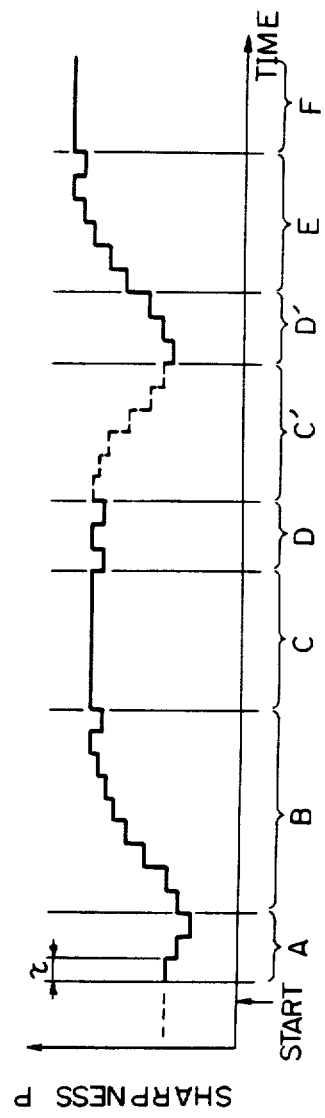

FOCUS DETECTING DEVICE WHICH VARIES BETWEEN A VARYING STATE AND A FIXED STATE

This application is a continuation of application Ser. No. 832,722, filed Feb. 25, 1986, now abandoned.

BACKGROUND OF THE INVENTION

1. Field of the Invention

The present invention relates to a focus detecting device adapted for use in automatic focusing of a video camera, a television camera or the like.

2. Related Background Art

There is already known a method of automatic focusing, for example in a video camera, of detecting the sharpness of an image on an image sensor from image signals obtained therefrom and moving a photographing lens so as to maximize said sharpness. In such method it has been necessary to vary the focus state of the image on the image sensor by suitable means and to detect the resulting change in sharpness of said image, since the moving direction of the photographing lens cannot be identified from a single image.

For this reason there has been employed a method of axially vibrating a part of lens elements in the photographing lens continuously by a small amount to constantly vary the focus state of the image on the image sensor, or a method of maintaining a fixed focus state after an in-focus state is reached, then inspecting an eventual change in the sharpness of the image caused by the movement of camera or object, and, in case of such change, moving the photographing lens in an arbitrary direction to identify a correct moving direction from a change in sharpness resulting from such lens movement. However, in the former method, deterioration of image quality is inevitable since the image on the image sensor is always slightly out of focus, and detection of change in sharpness becomes difficult if the amount of image blur is reduced in order to avoid deterioration of the image quality. On the other hand, the latter method tends to provide an unstable image since the photographing lens may be driven by an article eventually crossing in front of the object.

SUMMARY OF THE INVENTION

An object of the present invention is to provide a focus detecting device not associated with the drawbacks mentioned above and capable of constantly providing a satisfactory and stable image.

Another object of the present invention is to provide a focus detecting device capable of rapid focusing while maintaining a satisfactory image.

The foregoing objects can be achieved, according to the present invention, by a focus detecting device comprising an image sensor; sharpness detecting means for detecting the sharpness of an image from image signals obtained from said image sensor; in-focus state identifying means for identifying an in-focus state of the image on said image sensor by comparing plural values of sharpness detected in different focus states; and focus state control means for varying the focus state during a period t at an interval T, wherein $t < T$, and maintaining the focus state during a period $T - t$.

BRIEF DESCRIPTION OF THE DRAWINGS

FIGS. 4A and 4B are charts showing time-dependent change of refractive power and sharpness of an optical element with a variable refractive power.

DETAILED DESCRIPTION OF THE PREFERRED EMBODIMENTS

Figure 1:
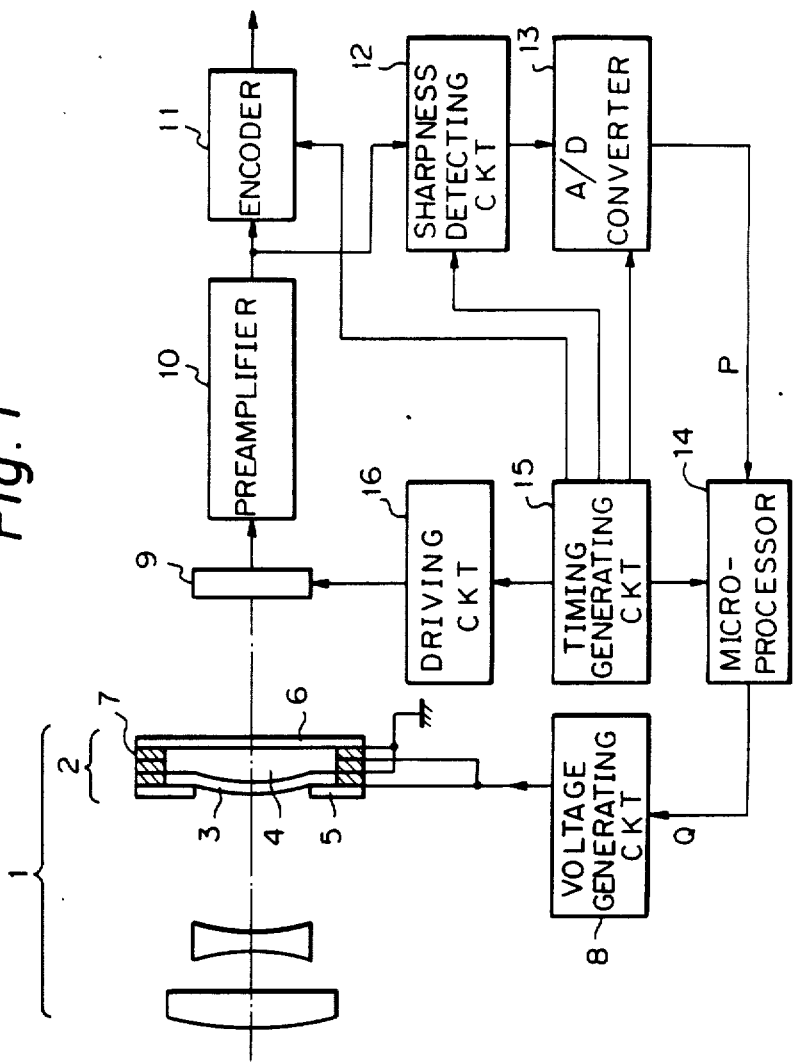
FIG. 1 is a block diagram of an embodiment of the focus detecting device of the present invention.

FIG. 1 shows an embodiment of the focus detecting device of the present invention, wherein provided are an imaging optical system 1; a variable-refractive power optical element 2 disclosed by the same assignee as the present application in the Japanese patent application No. 219113/1983 transparent elastic members 3, 4; an aperture plate 5 with a circular aperture; a glass plate 6; a container 7 receiving the elastic members 3, 4 and composed of laminated annular piezoelectric elements; and a voltage generating circuit 8. In said variable-refractive power optical element 2, the container 7 composed of annular piezoelectric elements contracts in the lateral direction in the drawing, according to a voltage supplied from the voltage generating circuit 8, to pressurize and deform the elastic members 3, 4 thereby deforming the surface of the elastic member 3 in the aperture plate 5 and thus modifying the refractive power $\phi$, and the amount of change of the refractive power $\phi$ is determined by a control signal Q supplied to the voltage generating circuit 8. An image sensor 9 is composed for example of a CCD, and is placed on a determined image plane in the imaging optical system 1. Consequently the change of the refractive power $\phi$ of the variable-refractive power optical element 2, caused by the control signal Q, induces a change in the focus state of the image of the object on the image sensor 9. More specifically, the image plane of the imaging optical system 1 moves toward the object by an increase of said refractive power $\phi$, and vice versa. There are further shown a preamplifier 10; an encoder 11 for mixing synchronization signals with image signals to obtain video signals; a sharpness detecting circuit 12 for detecting the sharpness of an image on the image sensor 9 from the image signals; an A/D converter 13; a microprocessor 14; a timing generating circuit 15 for generating timing signals for the entire system; and a driving circuit 16 for the image sensor 9.

Figure 2:
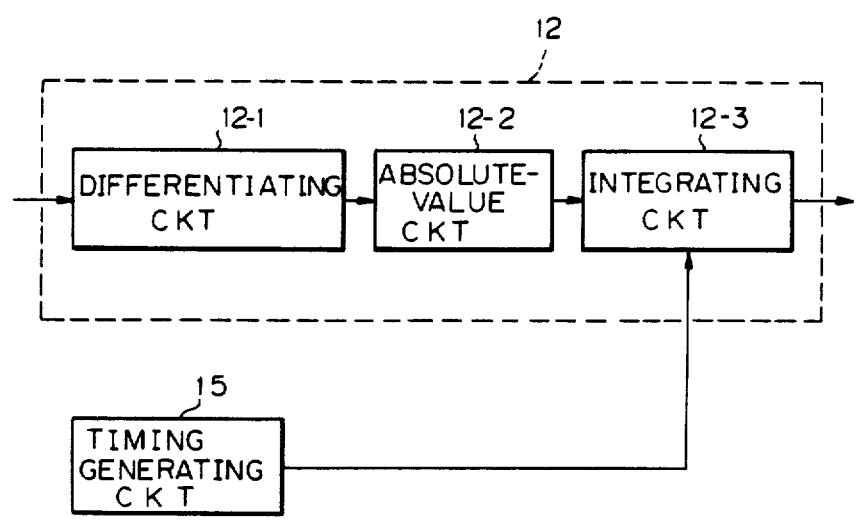
FIG. 2 is a block diagram of an example of a sharpness detecting circuit.

FIG. 2 shows an example of the sharpness detecting circuit 12 shown in FIG. 1, wherein provided are a differentiating circuit 12-1; an absolute-value circuit 12-2 and an integrating circuit 12-3. In order to identify the magnitude of the contrast of the image projected on the image sensor, a high-frequency component of the image in a determined area of the image sensor is extracted from each frame according to a timing signal from the timing generating circuit 15, and sent as a signal P for evaluating the image sharpness, hereinafter represented as sharpness P, to the microprocessor 14 through the A/D converter 13.

Figure 3A:
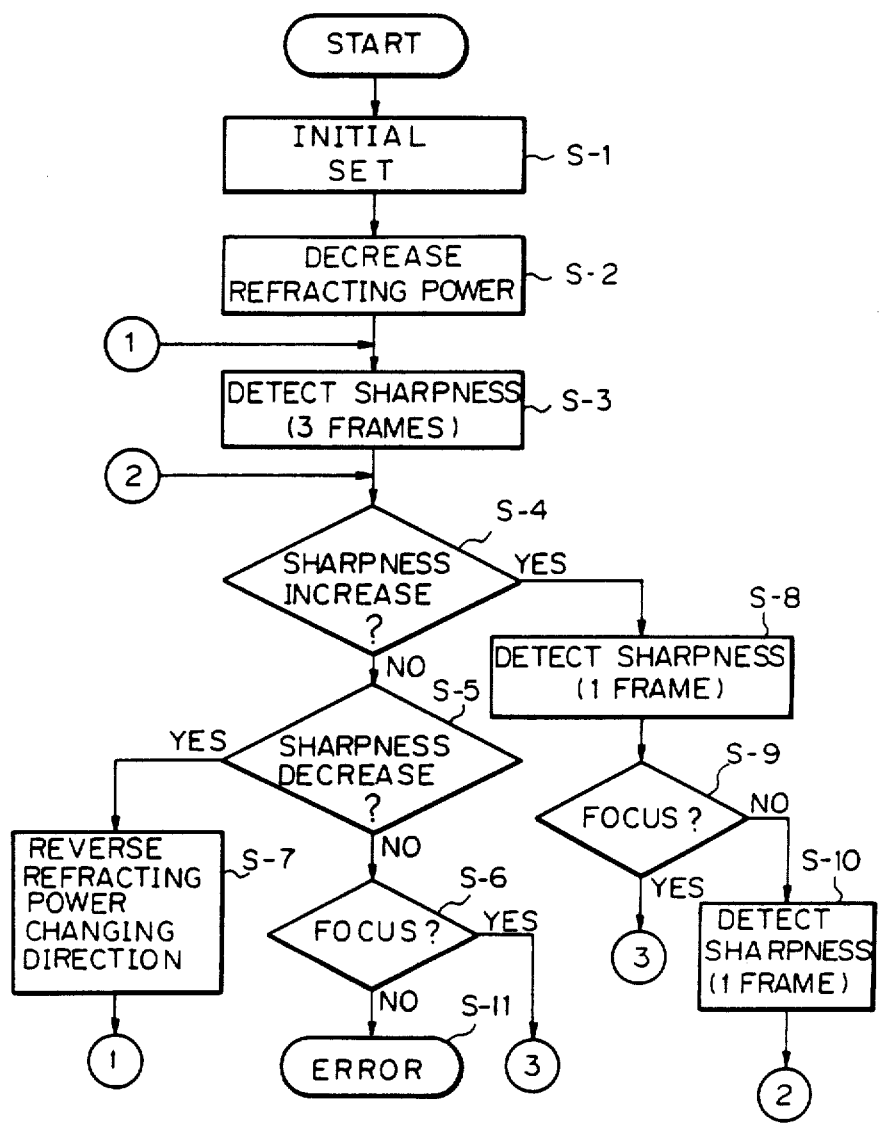
FIGS. 3A and 3B are flow charts showing the function of a microprocessor.
Figure 3B:
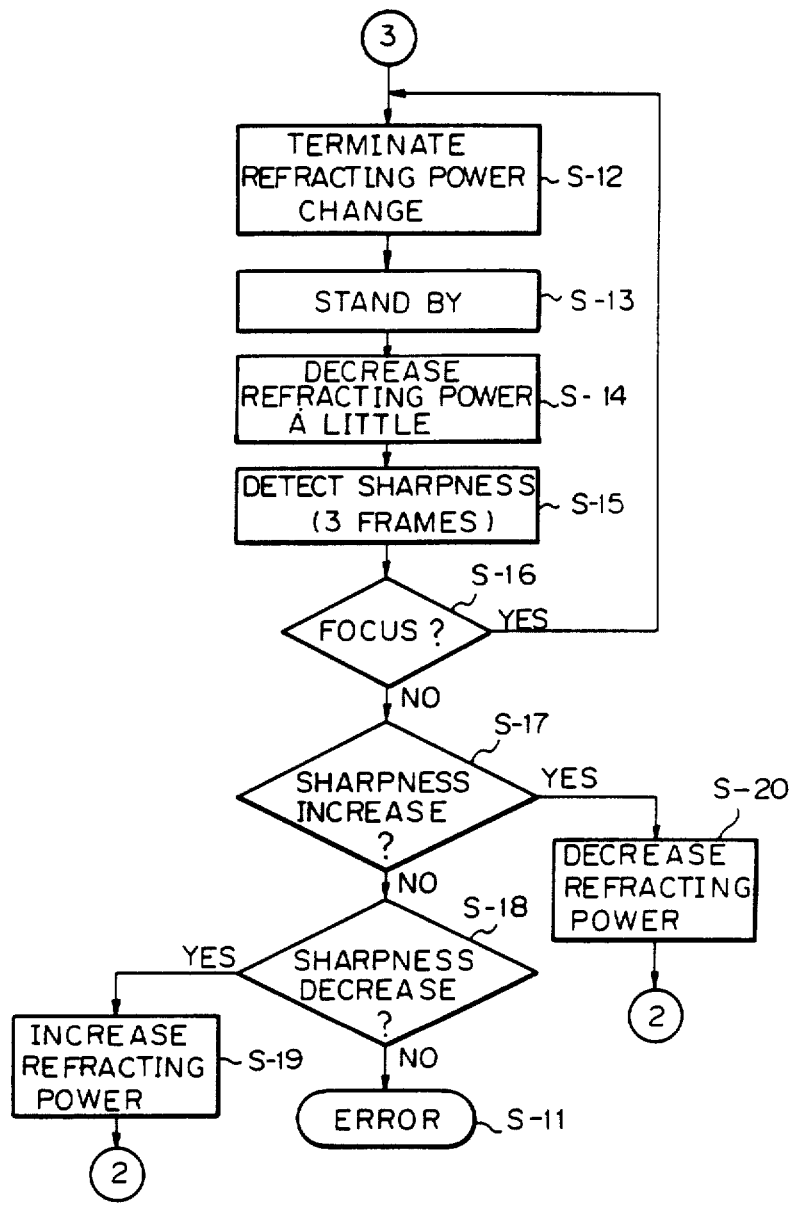

Now reference is made to FIGS. 3 and 4 for explaining the function of the microprocessor 14 and the procedure of detecting focus state in the present focus detecting device. FIGS. 3A and 3B are flow charts showing the basic function of the microprocessor 4, while FIG. 4A shows the time-dependent change of the refractive power $\phi$ of the variable-refractive power optical element 2, and FIG. 4B shows the time-dependent change of the image sharpness P detected by the sharpness detecting circuit 12. In FIG. 4, $\tau$ indicates a period corresponding to a frame. Thus the change in the sharpness P is delayed by a time $\tau$ from the corresponding change of the refractive power $\phi$. In FIG. 3, after an initial setting of registers etc. in a step S-1, the microprocessor 14 supplies, in a step S-2, a control signal Q to the voltage generating circuit 8 so as to reduce the refractive power $\phi$ of the element 2 at a determined rate from a predetermined value. The control signal Q to said voltage generating circuit 8 remains constant until varied next time. Consequently, after the start of operation, the refractive power $\phi$ decreases at a constant rate as in a period A shown in FIG. 4A. Then, in a step S-3, the microprocessor 14 fetches the values of sharpness P detected in three successive frames by the sharpness detecting circuit 12, and identifies the direction of change of the refractive power $\phi$, in steps S-4, S-5 and S-6, by the values of sharpness P detected in the immediately preceding three frames. More specifically an identification is made whether the values P1, P2, P3 of the sharpness P in said three frames are increasing (P1 < P2 < P3), decreasing (P1 > P2 > P3), have shown a maximum (P1 < P2 > P3), or otherwise. In case the sharpness P is decreasing as in the period A shown in FIG. 4A, indicating that the refractive power $\phi$ so varies as to move away from the in-focus state, a step S-7 inverts the direction of change of the refractive power $\phi$ as shown in a period B, and the program returns to the step S-3 to repeat the detection of the sharpness P and the identification of the direction of change of the refractive power $\phi$. On the other hand, the steps S-4, S-5 and S-6 idehtify that the sharpness P is increasing as in the period B, indicating that the refractive power $\phi$ is changing toward the in-focus state, a step S-4 retains the direction of change of the refractive power $\phi$, then the program proceeds to a step S-8 to fetch the value P4 of sharpness in a succeeding frame, and a step S-9 compares said value with the sharpness P3 of the immediately preceding frame. If P4 > P3, indicating that the refractive power $\phi$ is still increasing, a step S-10 fetches the sharpness P5 of a succeeding frame and the program returns to the step S-4. In the steps S-4, S-5, S-6, the direction of change of the refractive power $\phi$ is again identified with the sharprness values P3, P4 and P5. On the other hand, if P4 < P3 in the step S-9, i.e. P2 < P3 > P4 indicating the detection of a maximum value, the program proceeds to a step S-12. Also in case a maximum is detected in the steps S-4, S-5 and S-6, the program proceeds from the step S-6 to the step S-12 shown in FIG. 3B. On the other hand, if the steps S-4, S-5 and S-6 do not identify an increase, nor a decrease, nor a maximum in the sharpness P, the direction of change toward the in-focus state cannot be determined because the contrast of object is too low or because of a competition between far and close objects. In such case an error recovery step S-11 is executed to display a corresponding message in the view finder or to repeat the procedure from the start.

The value of sharpness P may not show a detectable change in response to a small change of the refractive power $\phi$ in case the optical system is significantly out of focus. In such case the refractive power $\phi$ is continuously changed until the sharpness P shows a detectable change or until the refractive power $\phi$ of the variable-refractive power optical element reaches a predetermined limit of the variable range, and the direction of change of the refractive power $\phi$ is identified from said change in the former case, or the direction of change of the refractive power $\phi$ is inverted in the latter case.

In case a maximum of the sharpness is identified in the step S-6 or S-9, the program branches to the step S-12, in FIG. 3B, to return the refractive power $\phi$ of the optical element 2 to a refractive power $\phi_0$ corresponding to the maximum sharpness or to the in-focus state, and a step S-13 maintains this state for a period T−t as shown in a period C in FIG. 4. Consequently the in-focus state is maintained during said period unless the camera or the object moves. After the lapse of said period T−t, a step S-14 varies the refractive power $\phi$ by a small amount around said value $\phi_0$ for a period t. In the present embodiment the refractive power is reduced from $\phi_0 + \Delta\phi$ to $\phi_0 - \Delta\phi$ as shown in periods D, D'. The varying range $\Delta\phi$ of the refractive power $\phi$ approximately corresponds to a movement of the image plane of the imaging optical system by the depth of focus thereof.

Then, a step S-15 fetches the values of sharpness in three successive frames during said small change of the refractive power $\phi$, and steps S-16, S-17 and S-18 compare thus fetched values in the same manner as in the steps S-4, S-4 and S-6 shown in FIG. 3A. If the sharpness is largest in the middle frame as in the period D in FIG. 4, the program returns to the step S-12 to retain the previous refractive power $\phi_0$ as in the period C'. On the other hand, if the sharpness P is increasing as in the period D', a step S-20 releases a control signal to further decrease the refractive power $\phi$, and the program returns to the step S-3 shown in FIG. 3A. If the sharpness is decreasing, a step S-19 releases a control signal to increase the refractive power $\phi$, and the program returns to the step S-3. If otherwise, there is effected the error recovery step S-11.

In FIG. 4, the period t of said small change of the refractive power $\phi$ is selected as $t = 3\tau$, but said period may be artitrarily selected so as to satisfy a condition $t \geq 3\tau$. For example there may be selected a condition $= 6\tau$ for detecting the values of sharpness P in every other three frames. Also in the foregoing explanation $\tau$ is assumed to correspond to the period of a frame, but it may be selected equal to the period of a field in case of interlaced scanning, or to the period of plural frames.

Also in the foregoing explanation, the direction of change of the refractive power $\phi$ is identified through comparison of the values of sharpness P in three frames, but it can also be identified from the values of sharpness in two frames. With successive values P1, P2 of the sharpness P and a detectable different $\Delta P$ thereof, an in-focus state is identified if $|P1 - P2| < \Delta P$. On the other hand, the direction of change of refractive power is maintained if P2 > P1, and it is inverted if P2 < P1.

Also, in case of a zoom lens, if the change of refractive power $\phi$ of the variable-refractive power optical element 2 is utilized not only for focusing to the object but also for compensating the change in the focal plane when the image magnification is changed, it is possible, in order to improve the response at focusing operation at such change of image magnification, to detect such change in image magnification, and, in case the image magnification is changed while the refractive power $\phi$ is maintained constant as in the periods C, C' in FIG. 4, to vary the refractive power $\phi$ by a small amount for identifying the new direction of change of the refractive power.

As explained in the foregoing, in the present invention, the focus state is varied by a small amount during a period t, by changing the imaging state of the imaging optical system as indicated by the periods D, D' shown in FIG. 4, at an interval T in the in-focus state, thereby confirming the focus state or identifying a new direction of focusing. It is thus possible to avoid fixing the lens to an erroneous focus state, for example, in case of a low-contrast object, and to rapidly identify the focusing direction. Besides, since the focus state is maintained constant during a period T−t, represented by the periods C, C' in FIG. 4, thus reducing the proportion of deteriorated image caused by the change of focus state in said periods D, D', it is rendered possible to reduce the deterioration of image quality. The deterioration of image quality is reduced by shortening the period t with respect to the interval T, but an excessively large value of T gives rise to a deteriorated response in automatic focusing. Consequently, in an ordinary television camera, T and t are preferably selected in ranges of $0.2 \sec. \leq T \leq 2 \sec.$ and $T/10 \leq t \leq T/3$. Also the values of T and t may be rendered variable. For example the value of T may be selected larger for a small lens aperture for which the time-dependent change of sharpness P is slow, and vice versa. Also the amount of small change $\Delta\phi$ of the refractive power $\phi$ of the optical element 2 may be rendered variable and is selected larger for a smaller lens aperture. Furthermore, instead of directly detecting the lens aperture, it is possible to vary the refractive power by a predetermined small amount after the in-focus state is reached, to estimate the lens aperture from the magnitude of change of sharpness in such variation of refractive power, and to regulate the amount of the small change of the refractive power according to thus estimated lens aperture.

As explained in the foregoing, in case the focus detecting device of the present invention is employed in relation to the zooming function and lens aperture, such additional functions can be achieved by the aforementioned microprocessor according to a predetermined program. Also additional means, such as means for detecting the image magnification, may be provided for achieving additional functions.

Figure 5:
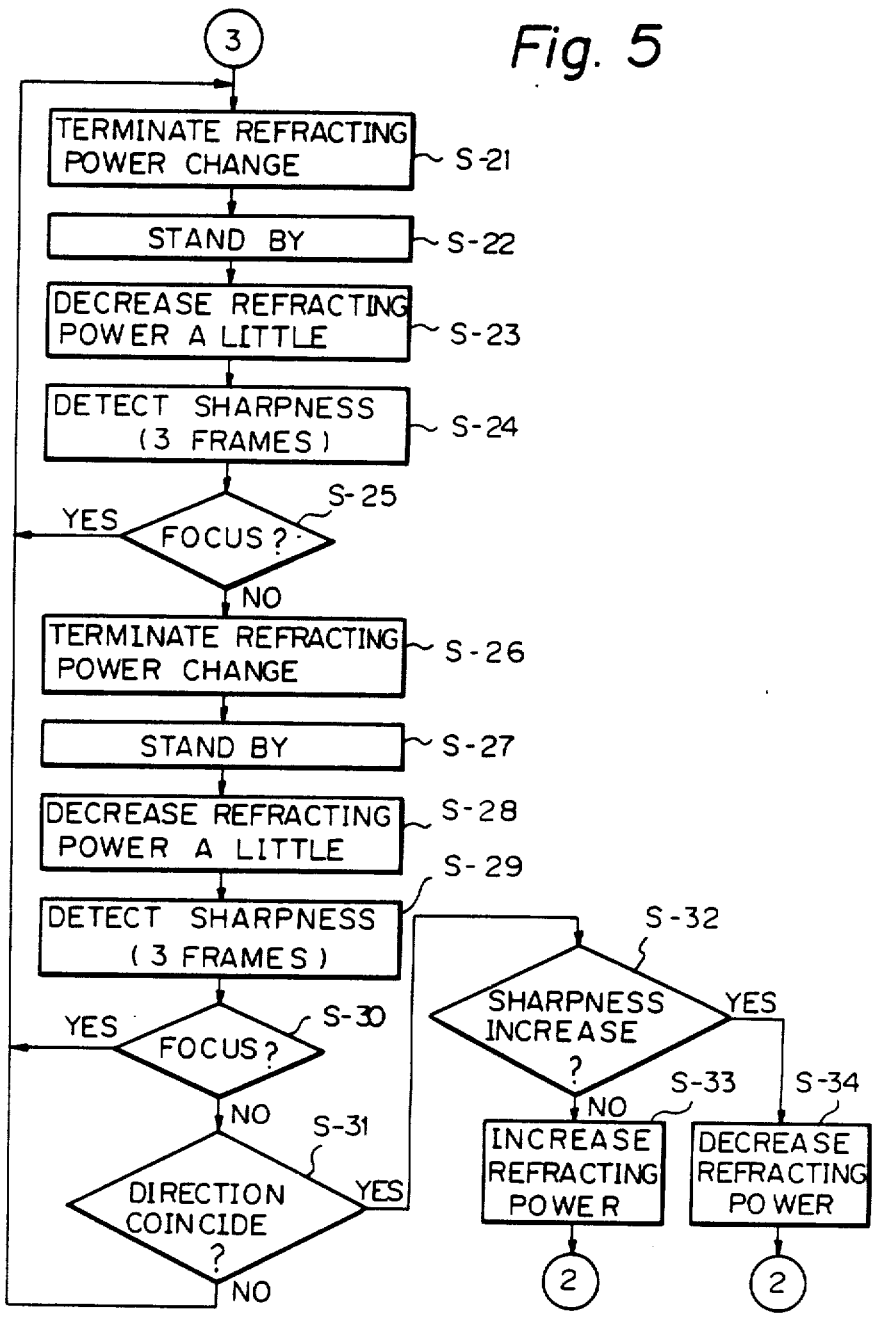
FIG. 5 is a flow chart showing another example of the flow chart shown in FIG. 3.

FIG. 5 shows a modification of a branch (3) in the flow chart shown in FIG. 3B. In this modification, after an in-focus state is reached, the refractive power $\phi$ is changed, by a small amount, twice with a certain interval therebetween, and a step S-31 identifies whether the direction of change of the sharpness P is same in these two changes. The refractive power $\phi$ is changed toward a new in-focus state if these directions are same, but is retained as before if these directions are mutually different. Consequently the focus state varies to increase the sharpness P only in response to a slow time-dependent change of the sharpness but does not vary in response to a rapid irregular change of the sharpness. For this reason a stable image can be obtained as the automatic focusing does not respond to the vibration of camera or a rapid panning thereof.

In the foregoing explanation the variable refractive power optical element 2 shown in FIG. 1 is utilized not only for varying the focus state by a small amount in the periods D, D' in FIG. 4 but also for causing a large change in the focus state for focusing as in the periods B, E, but other methods are also possible. For example the large change in focus state may be achieved by axially moving a lens group in the imaging optical system with a motor, and the small change may be achieved by varying the distance of two parallel glass plate, sandwiching silicon rubber, thus varying the thickness thereof, as disclosed in the Japanese Patent Application No. 32999/1984.

Also instead of said silicone rubber, it is possible to axially move a lens, preferably of a small diameter, in the imaging optical system, with a small moving mechanism, for example utilizing a piezoelectric element.

As explained in the foregoing, the focus detecting device of the present invention is capable of rapid focus detection through comparison of plural values of sharpness of an image on the image sensor, and is still capable of providing stable and satisfactory image almost unaffected by the focus detecting operation, by varying the focus state of the image on the image sensor for a period t at an interval T, wherein t<T, and maintaining the focus state for a period T−t.

Naturally the present invention is not limited to the foregoing embodiment but is subject to various modifications within the scope and spirit of the appended claims.

What is claimed is:

1. A focus detecting device comprising:
   an image sensor;
   sharpness detecting means for detecting the sharpness of an image from image signals obtained from said image sensor;
   focus state detecting means for detecting the focus state of the image on said image sensor through comparison of plural values of sharpness detected in different focus states; and
   focus state control means for varying the focus state for a period t at an interval T, wherein t<T and maintaining the focus state during a period T−t.

2. A focus detecting device according to claim 1, wherein said periods T and t satisfy a condition: $T/10 \leq t \leq T/3$.

3. A focus detecting device according to claim 2, wherein said period T in seconds satisfies a condition: $0.2 \leq T \leq 2.0$.

4. A focus detecting device according to claim 1, wherein said focus state detecting means is adapted to compare two values P1, P2 of the sharpness in different focus states.

5. A focus detecting device according to claim 4, wherein an in-focus state is identified by a condition: $|P1-P2|<\Delta P$, wherein P is a detectable difference of the sharpness.

6. A focus detecting device according to claim 1, wherein said focus state detecting means is adapted to compare three values P1, P2, P3 of the sharpness detected in different focus states.

7. A focus detecting device according to claim 6, wherein the state of said sharpness P2 is identified to indicate an in-focus state, in case said values P1, P2, P3 of sharpness satisfy a condition $P1<P2>P3$.

8. A focus detecting device according to claim 1, wherein the detection of said sharpness is effected in every frame of image.

9. A focus detecting device according to claim 1, wherein the detection of said sharpness is effected in every field of image.

10. A focus detecting device according to claim 1, wherein said sharpness detecting means comprises a differentiating circuit, an absolute value circuit and an integrating circuit.

11. A focus detecting device comprising:
    an image sensor;

sharpness detecting means for detecting sharpness of an image from image signals obtained from said image sensor;

focus state detecting means for detecting the focus state of the image on said image sensor through comparison of plural values of sharpness detected in different focus states; and focus state control means comprising first control means and second control means;

wherein said first control means is adapted to vary the focus state by a large amount on said image sensor, while said second control means is adapted to vary the focus state by a smaller amount in comparison with the amount of variation caused by said first control means, and said second control means is adapted to vary the focus state during a period t at an interval of T, wherein t<T, and to maintain the focus state for a period T−t.

12. A focus detecting device according to claim 11, wherein said second control means is adapted to vary the power of an associated optical system by small increments ±Δϕ during the period t, where Δϕ is a small change in the refracting power of said optical system.

13. A focus detecting device according to claim 12 wherein said value Δϕ approximately corresponds to the depth of focus of the system.

14. A focus detecting device according to claim 11, wherein said first and/or second control means is composed of an element with variable refractive power.

15. A focus detecting device according to claim 11, wherein said first control means comprises a movable lens group.

16. A focus detecting device according to claim 11, wherein said second control means comprises optical path length control means.

17. A focus detecting device comprising:
an image sensor;
means for forming an image of an object on said image sensor; and
means for varying a focus state of the image on said image sensor for a period t at an interval T, wherein t<T, after the image of the object on said image sensor has fallen into an in-focus state so as to discriminate if the image on said image sensor is presently in the in-focus state by detecting a state of change of the image on said image sensor in the period t.

18. A focus detecting device comprising:
an image sensor;
means for forming an image of an object on said image sensor;
detecting means for detecting a focus state of the image on said image sensor to output a signal corresponding to the focus state of the image;
means for varying the focus state of the image on said image sensor for a period t at an inteval T, where T<T, after the image of the object on said image sensor has fallen into an in-focus state; and
means for discriminating the present focus state of the image on said image sensor on the basis of a state of change of said signal in the period t.

19. A focus detecting method comprising the steps of:
causing an image of an object on an image sensor to fall into an in-focus state;
varying a focus state of the image on the image sensor for a period t at an interval T, where t<T; and
discriminating whether the image on the image sensor is presently in the in-focus state by detecting a state of change of the image on the image sensor in the period t.

20. A method according to claim 19, wherein said causing step is carried out again if said discriminating step finds the image on the image sensor in a de-focus state.

21. A method according to claim 19, wherein the periods T and t satisfy a condition: T/10≦t≦T/3.

22. A method according to claim 21, wherein the period T in seconds satisfies a condition: 0.2≦T≦2.0.

* * * * *

UNITED STATES PATENT AND TRADEMARK OFFICE
CERTIFICATE OF CORRECTION

PATENT NO. : 4,706,124
DATED : November 10, 1987
INVENTOR(S) : TAKESHI BABA, ET AL.

It is certified that error appears in the above-identified patent and that said Letters Patent is hereby corrected as shown below:

COLUMN 2

Line 18, "No. 219113/1983 transparent" should read
--No. 219113/1983, transparent--.
Line 66, "microprocessor 4," should read
--microprocessor 14,--.

COLUMN 3

Line 34, "idehtify" should read --identify--.
Line 46, "sharprness" should read --sharpness--.

COLUMN 4

Line 39, "artitrarily" should read --arbitrarily--.
Line 41, "=6τ" should read --t=6τ--.

COLUMN 5

Line 60, "variablerefractive" should read
--variable-refractive--.

COLUMN 6

Line 2, "plate," should read --plates,--.
Line 43, "sharpness in" should read --sharpness detected in--.

UNITED STATES PATENT AND TRADEMARK OFFICE
CERTIFICATE OF CORRECTION

PATENT NO. : 4,706,124
DATED : November 10, 1987
INVENTOR(S) : TAKESHI BABA, ET AL.

It is certified that error appears in the above-identified patent and that said Letters Patent is hereby corrected as shown below:

<u>COLUMN 8</u>

Line 17, "$T<T$," should read --$t<T$,--.

Signed and Sealed this

Thirty-first Day of January, 1989

Attest:

DONALD J. QUIGG

Attesting Officer

Commissioner of Patents and Trademarks